April 6, 1965  M. LUKAWSKY  3,176,785
AUTOMOTIVE VEHICLE ANTI-SKID DEVICE
Filed Jan. 9, 1963  2 Sheets-Sheet 1
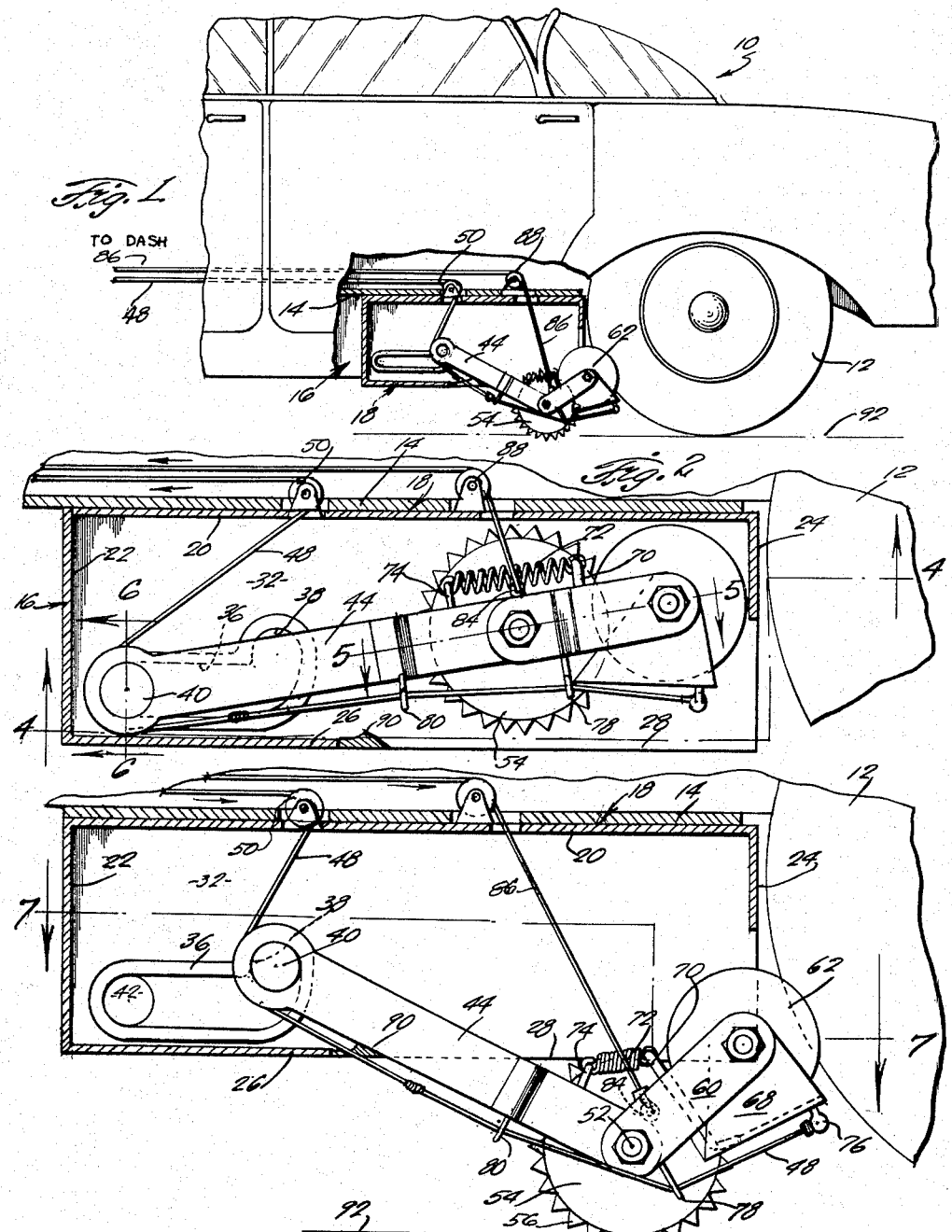
INVENTOR.
MICHAEL LUKAWSKY
BY
Victor J. Evans & Co.
Attorneys April 6, 1965  M. LUKAWSKY  3,176,785
AUTOMOTIVE VEHICLE ANTI-SKID DEVICE
Filed Jan. 9, 1963  2 Sheets-Sheet 2
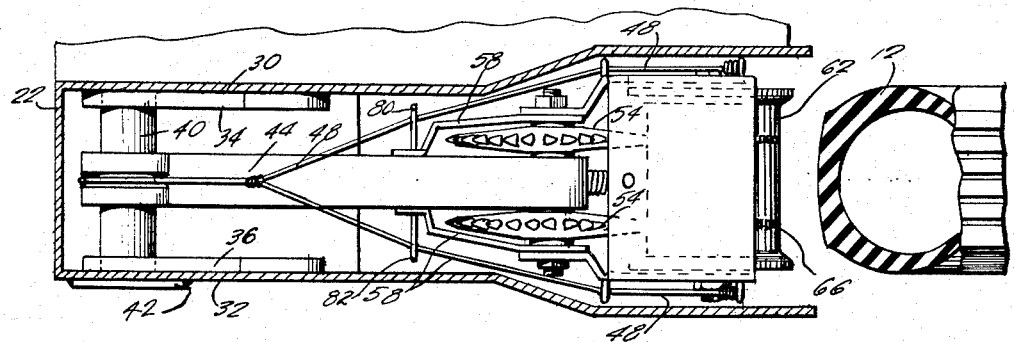
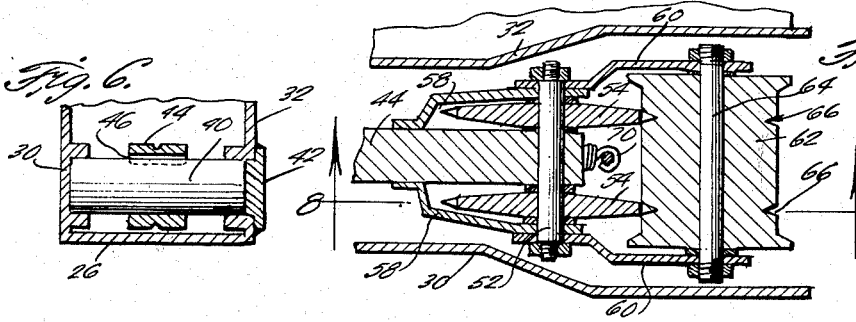
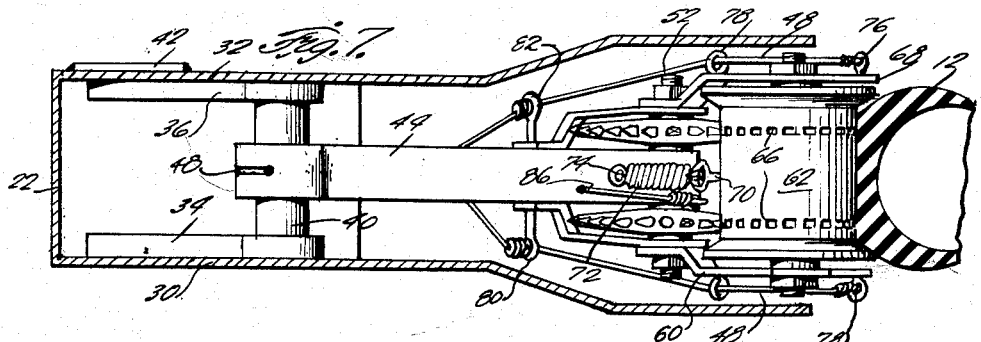
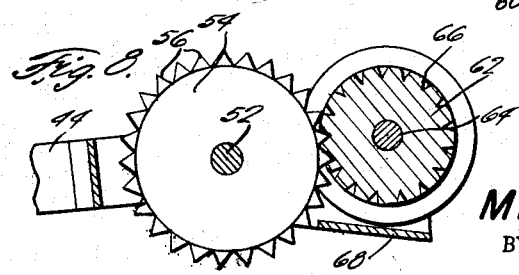
INVENTOR.
MICHAEL LUKAWSKY
BY

United States Patent Office 3,176,785
Patented Apr. 6, 1965

3,176,785
AUTOMOTIVE VEHICLE ANTI-SKID DEVICE
Michael Lukawsky, 871 N. 22nd St., Philadelphia, Pa.
Filed Jan. 9, 1963, Ser. No. 250,740
3 Claims. (Cl. 180—15)

The present invention relates to automotive vehicles generally and in particular to an anti-skid device for attachment to an automotive vehicle for use in ice and snow.

An object of the present invention is to provide a retractable anti-skid device for attachment to an automotive vehicle, one which may be lowered into operative position with ease and facility and as easily raised to the inoperative position, one which is sturdy in construction and derives its power from the drive wheels of the vehicle when installed thereon, and one which is simple in structure.

Another object of the present invention is to provide an anti-skid device for attachment to an automotive vehicle which lends itself to attachment to any vehicle having a drive wheel or pair of drive wheels, one which when extended engages the ground surface adjacent the drive wheels so as to crack the ice or brush the snow from the ground surface adjacent the drive wheel so as to afford traction to the drive wheel, and one which when in the retracted position is out of sight under the vehicle.

A further object of the present invention is to provide an anti-skid device for an automotive vehicle which is economical to manufacture, and one which requires no power source of its own for operation.

These and other objects and advantages of the present invention will be apparent from the description which follows and which is to be construed in the light of the attached drawings, in which:

FIGURE 1 is an elevational view of the rear portion of an automotive vehicle with a portion of the side wall of the vehicle broken away to shown the device of the present invention installed thereon, portions of the device being shown in section, FIGURE 2 is an elevational view of the device shown in FIGURE 1 on an enlarged scale, with portions in section, the device being shown in retracted position, FIGURE 3 is a view similar to FIGURE 2 with the device in operative position, FIGURE 4 is a view taken on the line 4—4 of FIGURE 2, FIGURE 5 is a view taken on the line 5—5 of FIGURE 2, FIGURE 6 is a view taken on the line 6—6 of FIGURE 2, FIGURE 7 is a view taken on the line 7—7 of FIGURE 3, and FIGURE 8 is a view taken on the line 8—8 of FIGURE 5.

With reference to the drawings in which like numerals indicate like parts throughout the several views, in FIGURE 1 an automobile is indicated by the reference numeral 10, only the rear portion of the vehicle being shown and only one of the drive wheels 12 being illustrated. The automobile 10 includes a frame 14 and the device of the present invention is designated generally by the reference numeral 16, the device including a housing 18 adjacent each of the drive wheels 12 but only one of the devices being shown.

The housing 18 includes a top 20, a forward wall 22, a rearward wall 24, a bottom 26 having an opening 28 therein, and spaced side walls 30 and 32 as shown in FIGURES 4 to 7, inclusive.

A pair of laterally spaced longitudinally arranged trackways 34 and 36 are disposed in each of the housings 18 adjacent the forward end wall 22 and each trackway 34, 36, is formed with an upwardly offset portion 38 at the rear end of the trackway.

The trackways 34 and 36 are mounted upon the side walls 30 and 32, respectively, and a cylindrical slide element 40 is slidably and rotatably mounted in each pair of trackways, the slide element 40 being insertable through an opening in the side wall 32, the opening being closed after insertion of the element 40 by a plate 42 welded to the side wall 32, as shown most clearly in FIGURE 6.

A beam 44 has one end secured by a key 46 (FIGURE 6) to the slide element 40 for sliding movement of the beam 44 and also for rotary movement of the beam 44 about the portion of the trackway 36 in which the slide element 40 is positioned as an axis. The rotary movement of the slide element 40 permits the beam 44 to be shifted from the retracted position of FIGURE 2 to the extended position of FIGURE 3 downwardly and out of the opening 28 in the bottom 26.

Hand actuable means is provided for effecting the movement of the beam 44 from the position in which its forward end is adjacent the forward end of the trackway 36 to the position in which its forward end is in the rearward end or offset portion 38 of the trackway 36. This hand actuable means consists in a flexible cable 48 operatively connected to the beam 44 at the end remote from the slide element 40 and traveling over pulleys 50 to a point in the automobile 10 adjacent the driver, for actuation by the driver, this portion of the cable not being shown as not forming part of the present invention.

A shaft 52 is fixed in the end of the beam 44 remote from the slide element 40 and carries thereon, on each side of the beam 44, a traction wheel 54 having its perimeter formed with its spikes 56.

The traction wheels 54 are freely rotatable about the shaft 52 as an axis and fixed support members 58 have their one ends welded to the beam 44 and the other ends provided with holes receiving the adjacent portions of the shaft 52, the supports 58 being exteriorly of the traction wheels 54 as shown most clearly in FIGURES 4 and 5.

An arm 60 extends rearwardly from each end of the shaft 52 and is pivotally connected thereto for swinging movement about the shaft 52 as an axis. Journaled in the ends of the arms 60 remote from the shaft 52 is a drum 62 mounted upon a fixed shaft 64 secured to the arms 60. The drum 62 is provided with two rows of indentations or recesses 66 each of which receives one of the spikes 56 of the adjacent traction wheel 54 in order that the drum 62 and the traction wheels 54 rotate together.

Extending beneath the drum 62 is the bight of a U-shaped bracket 68 having its legs secured to the arms 60. In the forward edge of the bight of the bracket 68 is anchored one end of an upright bolt 70 to the upper end of which is connected one end of a spring 72. The other end of the spring 72 is anchored in a bolt 74 which rises from the rearward end portion of the beam 44 as shown most clearly in FIGURES 2 and 3.

The spring 72 biases the arms 60 to positions at an angle with respect to the longitudinal axis of the beam 44, as shown in FIGURE 3.

Eyebolts 76 on the rearward edge of the bracket 68 receives bifurcated end portions of the cable 48 with the cable 48 going through eye-formations 78 projecting from the arms 60 and through other eye-formations 80 and 82 projecting downwardly from the beam 44. Another eye formation 84 is carried on the ends of the beam 44 adjacent the traction wheels 54 and a cable 86 has one end affixed thereto, the cable 86 traveling over pulleys 88 on the housing 18 to the vicinity of the driver's seat in the automobile 10 as previously described with reference to the cable 48.

The forward edge of the opening 28 in the bottom 26 of the housing 18 is provided with an upstanding shoulder 90 against which the beam 44 rests when the beam 44 is in the extended position of FIGURE 3.

In operation, by manipulation of the cables 48 and 86 from the driver's compartment, the beam 44 may be moved from the retracted position of FIGURE 2 by loosening of the cable 86 and permitting the beam 44 to rock downwardly as it is pulled backwardly by tension on the cable 48. The beam 44 will slide on the shoulder 90 to the position in FIGURE 3 in which the traction wheel 54 engages the ground surface indicated by the numeral 92 in FIGURES 1 and 3. When the traction wheel engages the ground surface, the spring 72 will pull the arms 60 upwardly but tension on the cable 48 will result in pressing the drum 62 against the periphery of the wheel 12 so that spinning of the wheel 12 will result in rotation of the spiked traction wheel 54 in the same direction. This will result in the spike traction wheel 54 cutting through the ice and snow and gaining traction on the surface 92 in spite of the slipping of the wheel 12.

When it is desired to retract the wheel 54 it is only necessary to slack off on the cable 48 a distance sufficient for the spring 72 to contract and raise the arms 60 so that the drum 62 clears the rearward end wall 24 of the housing 18 and then to apply traction to the cable 86 to draw the beam 44 to the retracted position of FIGURE 2 until the device is needed for further anti-skid operation on an icy street or roadway.

While only a preferred form of the invention has been shown and described it is intended that other forms of the invention may be practiced and that changes and modifications may be made in the invention without departing from the spirit thereof as set forth in the appended claims.

What is claimed is:

1. In an automotive vehicle including a frame and a pair of rotatable ground engaging wheels supporting said frame, a housing carried by said frame adjacent each of said wheels, each housing having spaced side walls and an open bottom, a longitudinally arranged horizontally disposed trackway on each of said housing side walls said trackway having first and second ends and an upwardly offset portion at said second end, said second end being adjacent to the ground engaging wheels, a slide element mounted in the trackways of each housing for sliding movement from said first to the second end of said trackways and for rotary movement in said trackways, beams having one end secured to said slide elements and having the other ends normally over the opening in said housing bottom, said beams other ends being swingable downwardly through said bottom opening upon execution of sliding movement of said elements from said first to said second ends of said trackways and upon execution of rotary movement of said slide elements, traction wheels journalled in the other ends of said beams, said traction wheels being adapted to engage the ground surface when said beams have been shifted from the normal position to a position with said one end thereof in the offset portion of the trackway and swung to the downward position, hand actuable means connected to said beam for effecting the movement of said beam, and means operatively connecting said traction wheel to the adjacent ground engaging wheel for rotation therewith when said traction wheels are in ground engaging positions.

2. In an automotive vehicle including a frame and a pair of rotatable ground engaging wheels supporting said frame, a housing carried by said frame adjacent each of said drive wheels, each housing having spaced side walls and an open bottom, a longitudinally arranged horizontally disposed trackway on each of said housing side walls and an upwardly offset portion in communication therewith, a slide element mounted in the trackways of each housing for sliding movement from one to the other ends of said trackways and upwardly offset portions and for rotary movement in said trackways, a beam having one end secured to said slide element and having the other end normally over the opening in said housing bottom, said beam other end being swingable downwardly through said bottom opening upon execution of sliding movement of said element from one to said other ends of said trackways and to the upwardly offset portions and upon execution of rotary movement of said slide element, a traction wheel journaled in the other end of said beam, said traction wheel being adapted to engage the ground surface when said beam has been shifted from the normal position to a position with said one end thereof adjacent said pair of trackway other ends and swung to the downward position, hand actuable means connected to said beam for effecting the movement of said beam, drums carried by the beam and disposed between said traction wheel and said ground engaging wheels when said traction wheels are in the ground engaging positions, said drums having means thereon engaging means on said traction wheel for driving said traction wheel when rotated, said drum being rotatable by engagement with said drive wheel when said traction wheel is in the ground engaging position.

3. In a automotive vehicle including a frame and a pair of rotatable ground engaging wheels supporting said frame, a housing carried by said frame adjacent each of said drive wheels, each housing having spaced side walls and an open bottom, a longitudinally arranged horizontally disposed trackway on each of said housing side walls and an upwardly offset portion in communication therewith, a slide element mounted in the trackways of each housing for sliding movement from one to the other ends of said trackways and for rotary movement in said trackways, a beam having one end secured to said slide element and having the other end normally over the opening in said housing bottom, said beam other end being swingable downwardly through said bottom opening upon execution of sliding movement of said element from one to said other ends of said trackways and upon execution of rotary movement of said slide element, a traction wheel journalled in the other end of said beam, said traction wheel being adapted to engage the ground surface when said beam has been shifted from the normal position to a position with said one end thereof adjacent said pair of trackway other ends and swung to the downward position, hand actuable means connected to said beam for effecting the movement of said beam, arms supported at one end upon the beams, drums journalled upon the opposite ends of the arms and between the traction wheels and the ground engaging wheels, and yieldable means normally disposing the traction wheels for active use and lockingly retaining the slide elements in the upwardly offset portions of the trackways, said drums being operatively connected with said traction wheels for driving said traction wheel when rotated, said drum being rotated by engagement with said drive wheel when said traction wheel is in the ground engaging position.

References Cited by the Examiner
UNITED STATES PATENTS

| 1,273,684 | 7/18 | Small | 180—15 |
| 2,351,601 | 6/44 | Dabbs | 152—214 |
| 2,463,634 | 3/49 | Martinis | 180—15 |
| 2,818,139 | 12/57 | Sutter | 180—15 X |
| 2,912,056 | 11/59 | Hamm | 180—15 |

A. HARRY LEVY, *Primary Examiner.*

LEO FRIAGLIA, *Examiner.*